UNITED STATES PATENT OFFICE.

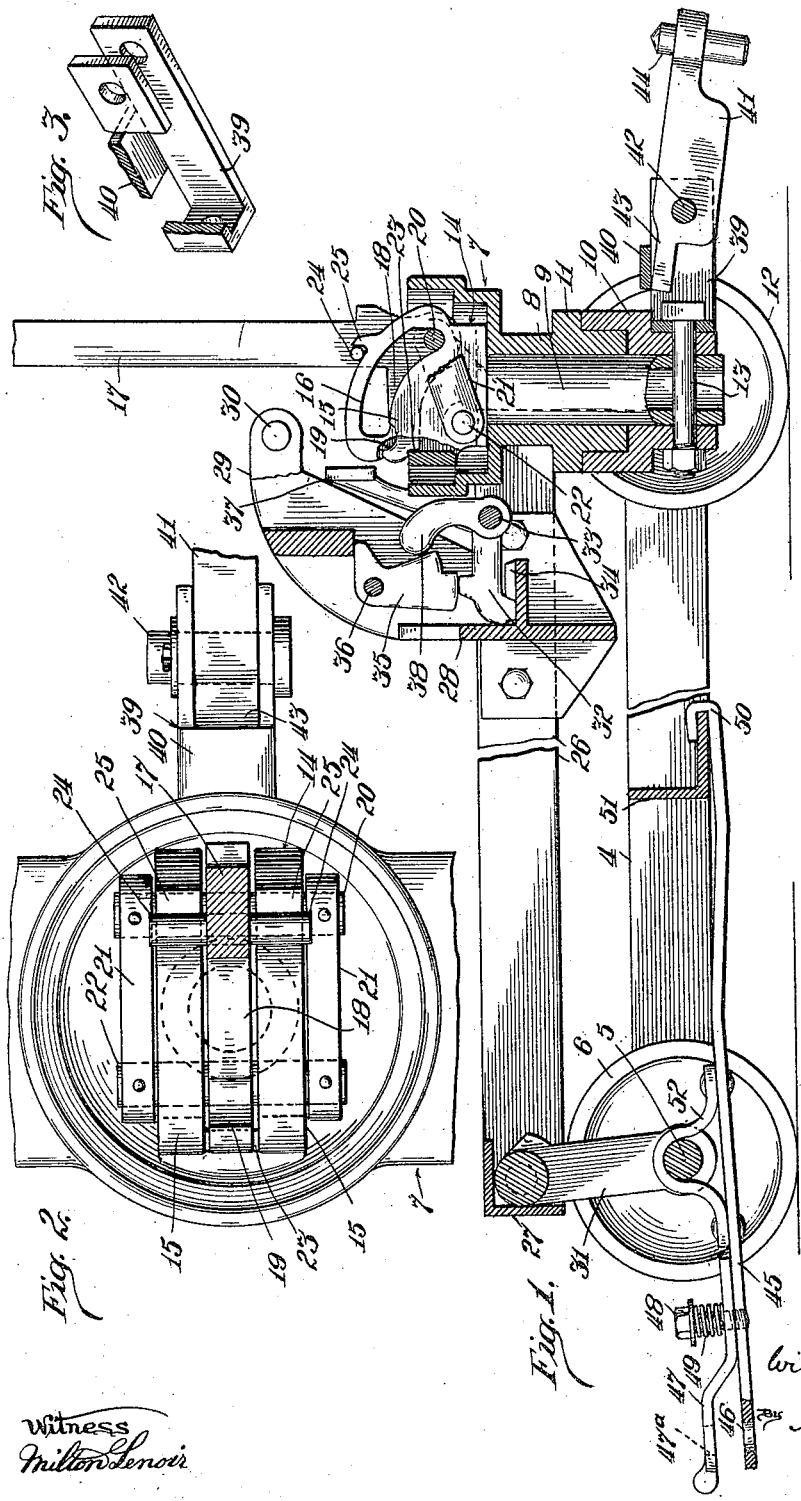

WILLIAM CHILDRESS, OF OAK PARK, ILLINOIS, ASSIGNOR TO ARTHUR M. BARRETT, OF WINNETKA, ILLINOIS.

LIFTING TRUCK.

1,402,480.
Specification of Letters Patent.
Patented Jan. 3, 1922.

Application filed May 3, 1920. Serial No. 378,419.

*To all whom it may concern:*

Be it known that I, WILLIAM CHILDRESS, a citizen of the United States, and a resident of Oak Park, in the county of Cook and State of Illinois, have invented certain new and useful Improvements in Lifting Trucks, of which the following is a specification, reference being had to the accompanying drawings.

My invention relates to lifting trucks of the type comprising a main frame supported on wheels, a lifting frame mounted on the main frame and arranged to be raised or lowered, and a steering lever or handle which may be used either to raise the lifting frame or to steer the truck. In trucks of this description it is old to provide either one or two steering wheels at the front end of the truck and to connect the handle with them so that when it is not being used for raising the lifting frame it may be swung to one side or the other to steer the truck, and be at the same time used as a draft device to draw or push the truck from place to place. As is well understood by those familiar with such trucks the lifting frame when lowered is arranged to be inserted under a suitable platform on which the articles to be moved are placed, this being accomplished by backing the truck under the platform. By then lifting the lifting frame the platform with its load is lifted and supported by the truck so that it can easily be transported. When the load has been lifted the lifting frame is locked in its elevated position, and when the place where the load is to be deposited is reached the lifting frame is released and permitted to descend, thereby depositing the platform on the floor and permitting the truck to be withdrawn. It is usual to provide the lifting frame with a check of some suitable description, such as the well-known hydraulic check used on doors, shock absorbers for automobiles, &c., and it is also old to employ a spring in connection with the check to start the descent of the lifting frame, and it will be understood that the truck shown in the drawings and hereinafter described may be equipped with a check and spring if desired. Also it should be understood that while I have shown my improved truck as equipped with two steering wheels, my invention is not limited to that construction, and the claims hereinafter made are to be construed accordingly.

In many factories it has been found desirable to use motors or shop tractors of various descriptions, operated either electrically or by internal combustion engines, for moving lifting trucks from place to place, and it is frequently desirable and expedient to connect several lifting trucks together in series so that they can be drawn by a single tractor. In such cases the lifting trucks have been connected together by means of the steering handles or levers, but the results obtained have not been satisfactory because this results in separating the trucks a considerable distance from each other, thereby not only objectionably increasing the length of the train but also making the manipulation of the train difficult because in that case the trucks do not track properly, so that difficulty is experienced in turning corners and moving the trucks through more or less tortuous passages or aisles. The object of my invention is to avoid these difficulties and to provide a lifting truck which may conveniently be coupled up with others in a train to be drawn by a tractor, the coupling devices being so arranged that the several trucks will track properly, while at the same time the steering handle will be held up out of the way so as not to interfere with the operation of the trucks making up the train, and yet may readily be released for use when its truck is separated from the train. I accomplish this object as illustrated in the drawings and as hereinafter described. What I regard as new is set forth in the claims.

In the accompanying drawings in which I have illustrated my improvements as applied to a lifting truck having the general characteristics of that described in an application for patent filed the 21st day of December, 1917, by Arthur M. Barrett, Serial No. 208,280,—

Fig. 1 is a central longitudinal vertical section of a truck (partly broken away) showing the steering handle in the upright position which it occupies when the truck is coupled up with others or with a motor;

Fig. 2 is an enlarged partial plan view of the cross-head at the front end of the truck showing the handle in section; and Fig. 3 is a perspective view, partly broken away, showing the coupling bracket.

In the truck illustrated the main frame is made up of opposite side bars 4 which at the rear are connected by an axle 5 which supports the rear wheels 6, said wheels being preferably journaled on the axle by means of suitable anti-friction bearings. At the front end of the truck the side bars 4 are connected by a cross-head 7 in the general form of an arch so that the central portion of the cross-head is somewhat higher than the side bars 4. This central portion is cylindrical in form and is provided with a depending sleeve 8 in which is fitted a king-bolt 9, as shown in Fig. 1. The lower end of the king bolt is connected to a cylindrical steering head 10 which telescopes upon the lower end of the sleeve 8 and abuts against an annular flange 11 intermediately disposed on said sleeve. The front wheels 12 are journaled in any suitable way at opposite sides of the steering head 10. Said steering head is connected with the king-bolt 9 by a bolt 13 so that it rotates therewith. As will be apparent, by rotating the king bolt 9 the steering head 10 and front wheels 12 may be turned to steer the truck. At its upper end the king bolt 9 is provided with a head 14 which is seated in the enlarged upper portion of the cross-head 7 and carries a pair of brackets 15 having arcuate slots 16. These brackets are spaced a short distance apart to receive between them the lower end of the steering lever or handle 17, as shown in Figs. 1 and 2. The lower end of said handle is in the form of a bell-crank lever, being provided with an arm 18 at an angle, preferably a right angle, with said handle. This arm is provided at its outer end with a socket or recess 19, the purpose of which will be hereinafter described. The handle 17 is mounted upon a pivot or fulcrum 20 which rides in the arcuate slots 16, and is connected with the king-bolt head 14 by links 21 which are pivoted to said head by a bolt 22. The links 21 and slots 16, therefore, support and guide the fulcrum 20 of the handle, and permit it to be shifted within the limits defined by the length of the slots 16. When the parts are in the position shown in Fig. 1 the outer end of the arm 18 is adapted to bear upon the rim 23 of the head 14, thereby preventing the handle from being rocked in a counterclockwise direction as viewed in Fig. 1. The purpose of this arrangement is to permit the handle to be conveniently used for pushing the truck when it is in its upright position. To prevent the handle from swinging in the opposite direction when the truck is being used as a trailer, it is provided near its lower end with a cross-pin 24 which is adapted to engage lugs 25 carried by the brackets 15, as shown in said figure. Thus the handle may be firmly secured in a substantially upright position, but it may readily be released for use in steering the truck, or for raising the elevating frame in the manner hereinafter described, by simply lifting it sufficiently to carry the cross-pin 24 out of engagement with the lugs 25.

The elevating frame of the truck is composed of side bars 26 connected at the rear by a cross-bar 27 and at the front by a yoke 28 which is rigidly secured to the side bars 26 in any suitable way. The intermediate portion of this yoke extends upward and forward to form a bifurcated arm 29 which carries a cross-pin 30 adapted to be engaged by the arm 18 of the handle 17 when said handle is moved to the proper position. The lifting frame is connected with the main frame in the usual way by swinging links, the rear links being shown at 31 in Fig. 1. The forward links are not shown, but their arrangement is well understood by those familiar with the art. It suffices to say that when the lifting frame is in its lowered position the links 31 and the corresponding links at the front end of the lifting frame occupy an approximately horizontal position, and by drawing the lifting frame forward said links will swing in a clockwise direction, as viewed in Fig. 1, thereby raising the lifting frame into the position shown in said figure. This movement of the lifting frame is accomplished by moving the fulcrum 20 of the handle 17 rearwardly in the slots 16, and swinging the handle to bring the recess 19 in its arm 18 into engagement with the cross-pin 30. By then rocking the lever 17 in a clockwise direction about its fulcrum the lifting frame will be drawn forward and elevated. After the lifting frame has been so elevated, it is locked in its elevated position by means of suitable locking devices, after which the lifting lever or handle may be disengaged from the pin 30 and swung away from its lifting position by moving its fulcrum 20 forward and downward in the slots 16. If it be desired to use the handle 17 for steering the truck, its pin 24 is carried over the lugs 25 so that the handle then projects forward in a convenient position for steering purposes, but if the truck is to be used as a trailer the handle is moved to its upright position and the pin 24 is brought into engagement with the lugs 25, as shown in Fig. 1.

For locking the lifting frame in its elevated position I have illustrated the same arrangement as that shown in said Barrett application hereinbefore referred to, which comprises a latch member 32 carried by a transverse shaft 33 and adapted to engage a lug 34 carried by the yoke 28. The shaft 33 is mounted in suitable bearings on the main frame. The latch member 32 is locked in operative engagement with the lug 34 by a swinging dog 35 pivoted at 36 to the yoke 28. It will be apparent that when the parts are in the position shown in Fig. 1 the lifting frame is held against moving in an endwise direction, and consequently cannot descend. By moving the dog 35 out of operative position, however, the latch member 32 may rise out of operative engagement with the lug 34, thereby permitting the lifting frame to drop. The dog 35 may be moved out of operative position as desired by means of a foot lever 37 which is mounted on the shaft 33 and through it actuates an arm 38 which bears against the dog 35 in such manner that by rocking the shaft 33 said dog is swung in a clockwise direction as viewed in Fig. 1, thereby releasing the latch member 32.

To permit the truck to be used either as a trailer or in a train with other trucks, the steering head 10 is provided with a bracket 39 which is preferably U-shaped as shown in Fig. 3, the open end of the bracket being toward the front. At the top said bracket is provided with a cross-bar 40, as shown in Figs. 1 and 3. The inner end of the bracket 39 is secured to the steering head 10 by means of the bolt 13 so that it is rigidly connected with said steering head. 41 indicates a link which fits into the open end of the bracket 39, to which it is secured by a horizontal pivot 42 so that said link can swing vertically to a limited extent. The pivot 42 is located between the ends of the link 41 to provide a rearwardly extending arm 43 which underlies the cross-bar 40, so that said bar operates to limit the downward movement of the front end of said link. 44 indicates a coupling pin tightly secured in the forward end portion of the link 41, as shown at the right in Fig. 3. Said pin projects above and below the link 41 to engage a coupling device shown at the left in said figure. The latter coupling device, which may either be carried by the rear end of another truck or by a tractor of any suitable description, comprises a bar 45 having a hole 46 adapted to receive the lower portion of the coupling pin 44, and a strap 47 which is mounted upon the bar 45 and is connected thereto by a bolt 48 screwed into the bar 45 and passing loosely through a hole provided in the strap 47. A spring 49 mounted on the bolt 48 serves to press the strap 47 down upon the bar 45. One end portion of the strap 47 is bent so that it lies a short distance away from the bar 45, and this bent portion of said strap is provided with a hole 47$^a$ which is adapted to register with the hole 46 and to receive the upper portion of the coupling pin 44. The arrangement is such that the strap 47 may be moved upward against the tension of the spring 49 sufficiently to disengage the upper portion of the pin 44. The strap 47 may then be swung to one side to permit the withdrawal of the lower portion of the pin 44 from the hole 46, thereby uncoupling the link 41 from the bar 45. The bar 45 is secured to the main frame of the truck by means of a hook 50 provided at its forward end, which is adapted to engage the horizontal flange of an L-shaped brace 51 which connects the side bars 4 of the main frame. The bar 45 is also secured to the rear axle 5 by a strap 52, as shown in Fig. 1. Thus the rear coupling is secured to the main frame so that it is not free to swing laterally, and consequently when connected with a following truck by a coupling device such as the link 41 and the bracket 39 the trailing truck is caused to track properly. While the arrangement described for connecting the draw bar 45 with the rear portion of the truck is simple and efficient, my invention is not limited to the precise construction shown, as other suitable means may be employed. The coupling devices described enable the truck to be readily connected with or disconnected from other trucks or a tractor, and do not interfere with the convenient use of the truck when used individually.

So far as I am aware I am the first in the art to provide a lifting truck with coupling devices connected with the steering wheel or wheels, in connection with a steering handle arranged to be held up out of the way when the truck is used as a trailer, and generic claims to such construction are, therefore, hereinafter made.

What I claim as my invention and desire to secure by Letters Patent, is—

1. A lifting truck comprising a main frame having supporting wheels and a steering member, a lifting frame mounted on said main frame, a steering handle adapted to be operated to raise the lifting frame, means whereby the handle may be secured in a substantially upright position, and coupling means connected with the steering member, for the purpose specified.

2. A lifting truck comprising a main frame having supporting wheels and a steering member, a lifting frame mounted on said main frame, a steering handle adapted to be operated to raise the lifting frame, means whereby the handle may be secured in a substantially upright position, and coupling devices at the opposite ends of the truck, the coupling devices at the forward end of the truck being connected with the steering member.

3. A lifting truck comprising a main frame having supporting wheels and a steering member, a lifting frame mounted on said main frame, a steering handle connected with the steering member and having means for operatively engaging said lifting frame, whereby the handle may be employed to steer the truck or to elevate said lifting frame, and coupling means connected with the steering member for the purpose specified.

4. A lifting truck comprising a main frame having supporting wheels and a steering member, a lifting frame mounted on said main frame, a steering handle connected with the steering member and having means for operatively engaging said lifting frame, whereby the handle may be employed to steer the truck or to elevate said lifting frame, means whereby the handle may be secured in a substantially upright position when disconnected from said lifting frame, and coupling means connected with said steering member, for the purpose specified.

5. A lifting truck comprising a main frame having supporting wheels and a steering member, a lifting frame mounted on said main frame, a king bolt connected with the steering member, a steering handle mounted on said king bolt and having means for engaging and actuating said lifting frame, and coupling means connected with said king bolt.

6. A lifting truck comprising a main frame having supporting wheels and a steering member, a lifting frame mounted on said main frame, a king bolt connected with the steering member, a steering handle mounted on said king bolt and having means for engaging and actuating said lifting frame, means whereby the handle may be secured in a substantially upright position when disconnected from said lifting frame, and coupling means connected with said king bolt.

7. A lifting truck comprising a main frame having supporting wheels and a steering member, a lifting frame mounted on said main frame, a king bolt connected with the steering member, a steering handle, a fulcrum for said handle movably connected with said king bolt whereby the handle may be moved into and out of position to engage said lifting frame, and means whereby the handle may be secured in a substantially upright position when disengaged from said lifting frame.

8. A lifting truck comprising a main frame having supporting wheels and a steering member, a lifting frame mounted on said main frame, a king bolt connected with the steering member, a steering handle, swinging links connecting said handle with said king bolt, whereby the handle may be moved into and out of position to engage said lifting frame, and means whereby the handle may be secured in a substantially upright position when disengaged from said lifting frame.

9. A lifting truck comprising a main frame having supporting wheels and a steering member, a lifting frame mounted on said main frame, a king bolt connected with the steering member, a steering handle, brackets carried by said king bolt and having arcuate slots, a fulcrum for said handle moving in said slots, links connecting said fulcrum with the king bolt, and means carried by said brackets for holding said handle in a substantially upright position.

10. A lifting truck comprising a main frame having supporting wheels and a steering member, a lifting frame mounted on said main frame, a steering handle adapted to be operated to raise the lifting frame, a vertically swinging link connected with one end portion of said main frame, said link having a fixed coupling pin, and a coupling device connected with the opposite end portion of the truck, said coupling device comprising a bar secured to the truck and a strap pivotally connected with said bar, said bar and strap having registering holes adapted to receive a coupling pin and a spring for normally holding said strap and bar in operative relation to each other.

11. A lifting truck comprising a main frame having supporting wheels and a steering member, a lifting frame mounted on said main frame, a steering handle adapted to be operated to raise the lifting frame, a bracket rigidly connected with said steering member, a vertically swinging link mounted in said bracket, a coupling pin carried by said link, and a coupling device secured to the rear portion of said main frame, said coupling device comprising separable members adapted to receive a coupling pin.

WILLIAM CHILDRESS.